(12) United States Patent
Asano et al.

(10) Patent No.: US 8,229,183 B2
(45) Date of Patent: Jul. 24, 2012

(54) IMAGING APPARATUS

(75) Inventors: Tomoyuki Asano, Kanagawa (JP); Yuko Yoshida, Tokyo (JP); Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 11/933,793

(22) Filed: Nov. 1, 2007

(65) Prior Publication Data

US 2008/0130969 A1 Jun. 5, 2008

(30) Foreign Application Priority Data

Nov. 2, 2006 (JP) ................................. 2006-299176

(51) Int. Cl.
*G06K 9/00* (2006.01)

(52) U.S. Cl. ......... 382/124; 382/100; 382/115; 382/126

(58) Field of Classification Search ........................ None
See application file for complete search history.

(56) References Cited

U.S. PATENT DOCUMENTS

| | | | | |
|---|---|---|---|---|
| 5,483,601 A * | 1/1996 | Faulkner | ........................ | 382/115 |
| 5,852,670 A * | 12/1998 | Setlak et al. | .................... | 382/126 |
| 5,895,902 A * | 4/1999 | Ziarno | ............................ | 235/380 |
| 6,011,860 A * | 1/2000 | Fujieda et al. | ................. | 382/126 |
| 6,144,757 A * | 11/2000 | Fukuzumi | ..................... | 382/124 |
| 6,289,114 B1 * | 9/2001 | Mainguet | ....................... | 382/124 |
| 6,307,956 B1 * | 10/2001 | Black | ............................. | 382/124 |
| 6,327,376 B1 * | 12/2001 | Harkin | .......................... | 382/124 |
| 6,829,375 B1 * | 12/2004 | Higuchi | ........................ | 382/124 |
| 7,361,919 B2 * | 4/2008 | Setlak | ............................ | 250/556 |
| 7,689,013 B2 * | 3/2010 | Shinzaki | ....................... | 382/124 |
| 7,751,593 B2 * | 7/2010 | Hombo | ......................... | 382/115 |
| 7,760,916 B2 * | 7/2010 | Sato | ................................ | 382/115 |
| 7,760,920 B2 * | 7/2010 | Abiko | ............................ | 382/124 |
| 7,773,870 B2 * | 8/2010 | Naruse | ............................ | 396/15 |
| 7,783,088 B2 * | 8/2010 | Shinzaki et al. | ............. | 382/124 |
| 2003/0016345 A1 | 1/2003 | Nagasaka et al. | | |
| 2005/0244039 A1 * | 11/2005 | Geoffroy et al. | .............. | 382/126 |
| 2007/0177767 A1 * | 8/2007 | Miura et al. | ................... | 382/115 |
| 2007/0215558 A1 * | 9/2007 | Niinuma et al. | .............. | 210/767 |
| 2008/0037001 A1 * | 2/2008 | Yokoyama et al. | ............. | 356/51 |

FOREIGN PATENT DOCUMENTS

| | | |
|---|---|---|
| JP | 1999-197135 | 7/1999 |
| JP | 2003-300712 | 10/2003 |
| JP | 2005-143804 | 6/2005 |
| JP | 2006-181296 | 7/2006 |

* cited by examiner

*Primary Examiner* — Tom Y Lu
*Assistant Examiner* — Thomas Conway
(74) *Attorney, Agent, or Firm* — Finnegan, Henderson, Farabow, Garrett & Dunner, L.L.P.

(57) ABSTRACT

An imaging apparatus includes at least two living-body detecting units, a imaging unit, and a drive unit. The living-body detecting units are provided at a imaging position where a part of a living body is laid, in conformity with the shape of the part of the living body. The imaging unit images the part of the living body, which is laid at the imaging position. The drive unit drives the imaging unit when all of the at least two living-body detecting units detect the living body.

12 Claims, 11 Drawing Sheets

IMAGING APPARATUS

CROSS REFERENCES TO RELATED APPLICATIONS

The present invention contains subject matter related to Japanese Patent Application JP 2006-299176 filed in the Japanese Patent Office on Nov. 2, 2006, the entire contents of which being incorporated herein by reference.

BACKGROUND OF THE INVENTION

1. Field of the Invention

The present invention relates to an imaging apparatus that is fit for use in biometric authentication, for example.

2. Description of the Related Art

Blood vessels have come to be considered as one of biometrical characteristics of a human being. In most cases, the blood vessels in a finger are imaged for identification of a person. A guide is used to set the finger correctly at a imaging position. (See, for example, Jpn. Pat. Appln. Laid-Open Publication No. 2005-71118.)

If the imaging apparatus has a guide, the base on which the imaging apparatus is mounted will lose freedom of design and will become larger. It is therefore demanded that the guide should not be used.

SUMMARY OF THE INVENTION

If the guide is not used, however, it is not possible for the finger to be correctly set at the imaging position. That is, the problem that the finger is often set at a position deviating from the imaging position remains unsolved.

The present invention has been made in consideration of the foregoing. To provide an imaging apparatus that can prevent the finger from shifting from the imaging position, without using a guide.

In view of the above circumstances, there is provided an imaging apparatus according to an embodiment of the present invention including: at least two living-body detecting units that are provided at an imaging position where a part of a living body is laid, in conformity with the shape of the part of the living body; an imaging unit that images the part of the living body, which is laid at the imaging position; and a drive unit that drives the imaging unit when all of the at least two living-body detecting units detect the living body.

In the imaging apparatus, the living-body detecting units can function not only as triggers for the imaging of the part of the living body, but also as guide for guiding the part of the living body to the finger-resting position. Positional deviation of the finger with respect to the imaging unit can therefore be prevented, without using any guide. Therefore, the imaging apparatus can be smaller than in the case where it has a physical guide.

According to the present invention, the living-body detecting units can function not only as triggers for the imaging of the part of the living body, but also as guide for guiding the part of the living body to the finger-resting position. Hence, positional deviation of the finger can therefore be prevented, without using any guide.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

An embodiment of the present invention will be described with reference to the accompanying drawings.

(1) Outer Configuration of a Cellular Telephone

Figure 1:
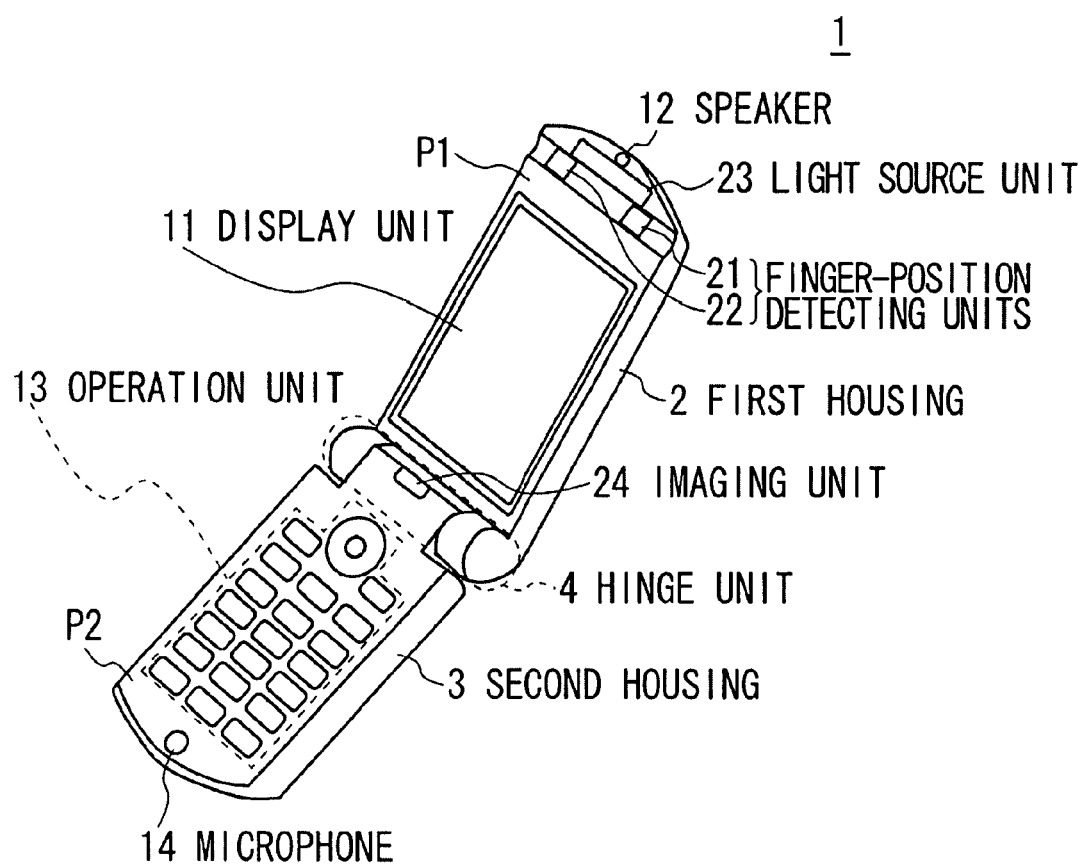
FIG. 1 is a perspective view showing the outer configuration of a cellular telephone according to an embodiment of the present invention.

FIG. 1 shows the outer configuration of a cellular telephone 1 according to an embodiment of the present invention. The cellular telephone 1 includes a first housing 2, a second housing 3, and a hinge unit 4. The first housing 2 and the second housing 3 are substantially rectangular.

A display unit 11 is provided in the center part of one surface P1 of the first housing 2. A speaker 12 is provided in the surface P1, at that edge thereof, which opposes the hinge unit 4. On one surface P2 of the second housing 3, an operation unit 13 is provided. The operation unit 13 includes a power-supply key, a call key, a menu key, and a character-keypad. A microphone 14 is provided in the surface P2, at the edge thereof, which opposes the hinge unit 4.

The hinge unit 4 has a recess made in one end of the first housing 2, a projection integrally formed with one end of the second housing 3, and a pin extending at right angles to the direction of thickness of the housings 2 and 3. The pin couples the projection to the first housing 2. The first housing 2 or the second housing 3 can be rotated around the pin, between first and second positions. At the first position (hereinafter, called closed position), the surface P1 of the first housing 2 and the surface P2 of the second housing 3 oppose each other. At the second position (hereinafter, called opened position), the surfaces P1 and P2 lie substantially in the same plane.

Figure 2:
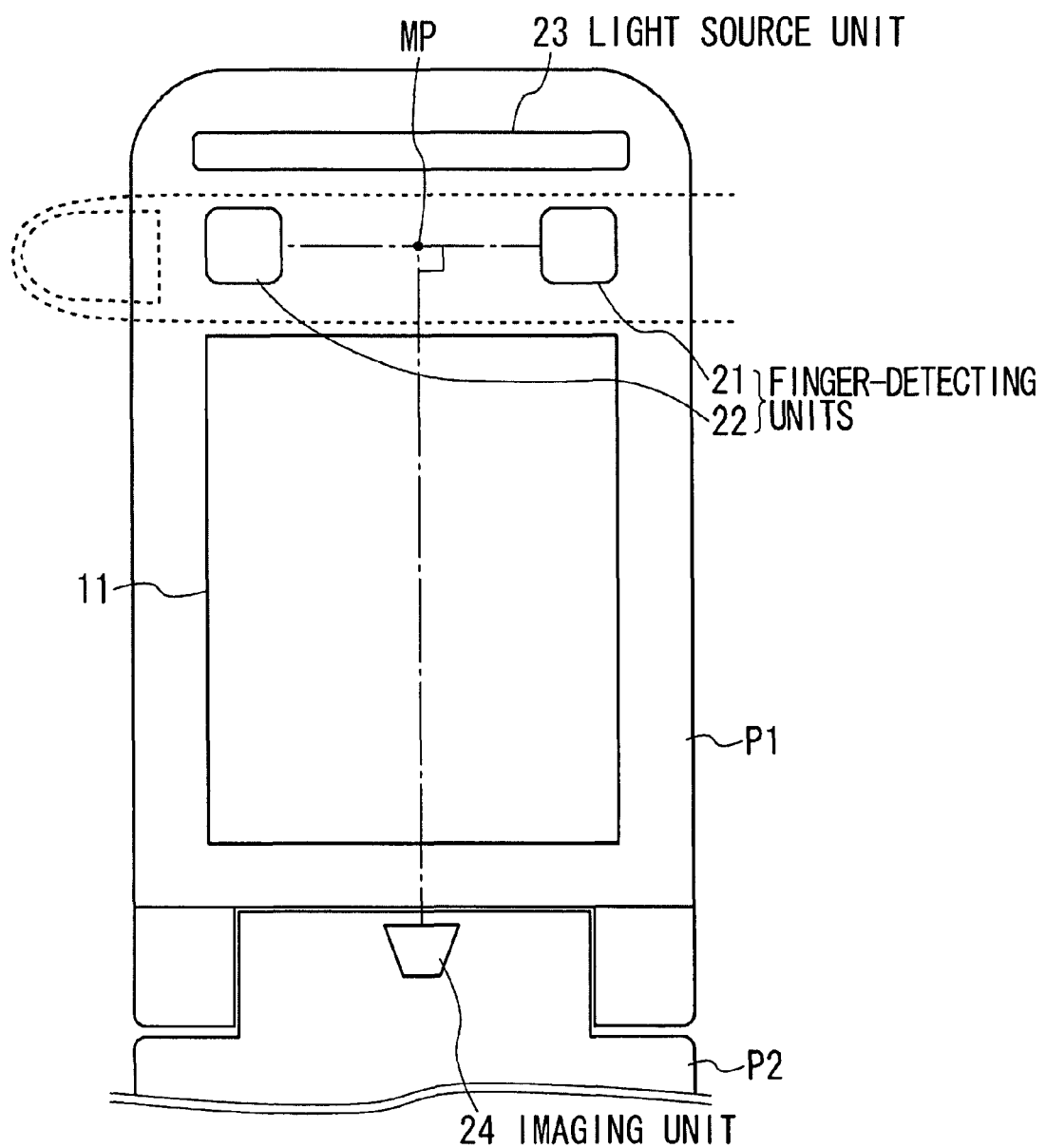
FIG. 2 is a diagram showing the positional relation the finger-position detecting units and the imaging unit have with the finger laid on the cellular telephone.

The cellular telephone 1 according to this embodiment has the function of imaging the formation pattern of the blood vessels in the finger (hereinafter referred to as blood-vessel pattern). As shown in FIG. 2, the region of the surface P1 of the first housing 2, which lies between the upper edge of the display unit 11 and the speaker 12, is allocated as finger-resting position.

At the finger-resting position, sensor units 21 and 22 of a pressure-detecting type (hereinafter referred to as finger-position detecting units) are arranged, spaced apart by a predetermined distance in the direction that the user's finger may extend straight.

A light source unit 23 is provided on the region of the surface P1 of the first housing 2, which lies between the speaker 12 and the finger-position detecting units 21 and 22. The light source unit 23 emits near-infrared light.

On the projection integrally formed with the second housing 3, an imaging unit 24 is provided. More precisely, the imaging unit 24 is located on a line which is perpendicular to the line connecting the finger-position detecting units 21 and 22 and which passes the midpoint MP on this line.

Therefore, the near-infrared light emitted from the light source unit 23 illuminates the finger laid on both finger-position detecting units 21 and 22 and passes through the finger and reaches the imaging unit 24. While passing through the finger, the near-infrared light is reflected and scattered, working as blood-vessel projecting light. The blood-vessel projecting light is applied to the imaging unit 24.

Figure 3:
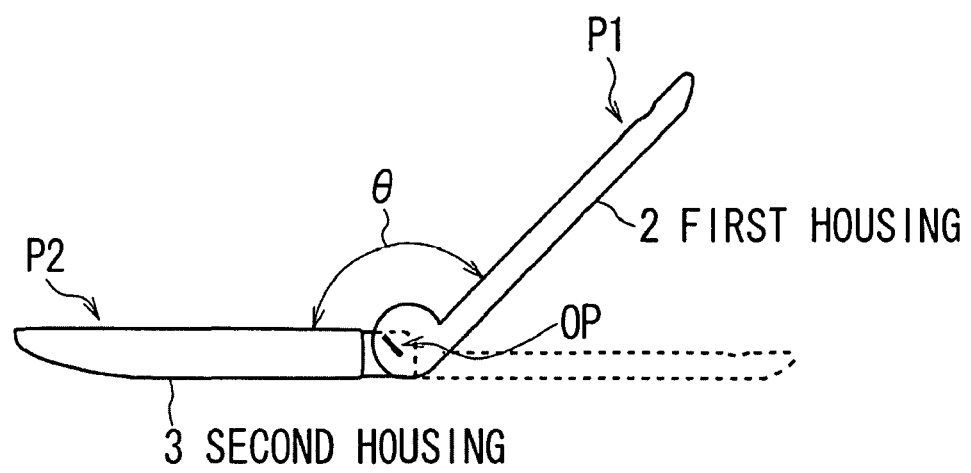
FIG. 3 is a diagram showing the positional relation between the housing and the imaging opening.

In addition, the hinge unit 4 is configured to position the first housing 2 and the second housing 3, such that the surfaces P1 and P2 define a specific angle θ as illustrated in FIG. 3. (The angle θ will be referred to as finger-imaging angle, hereinafter.) Thus, the first and second housing 2 and 3 can be positioned, each inclined to the other at the finger-imaging angle θ.

The imaging unit 24 provided on the projection integrally formed with the second housing 3 has an imaging opening OP. The imaging opening OP is arranged in a direction perpendicular to the surface P1 of the first housing 2 that is positioned by the finger-imaging angle θ (FIG. 3). Through the opening OP, light can be applied to an imaging element in a direction that is parallel to the surface P1 on which the finger is laid. Therefore, the cellular telephone 1 can reduce the distortion of the blood-vessel pattern that occurs as the pattern is projected.

(2) Circuit Configuration of the Cellular Telephone

Figure 4:
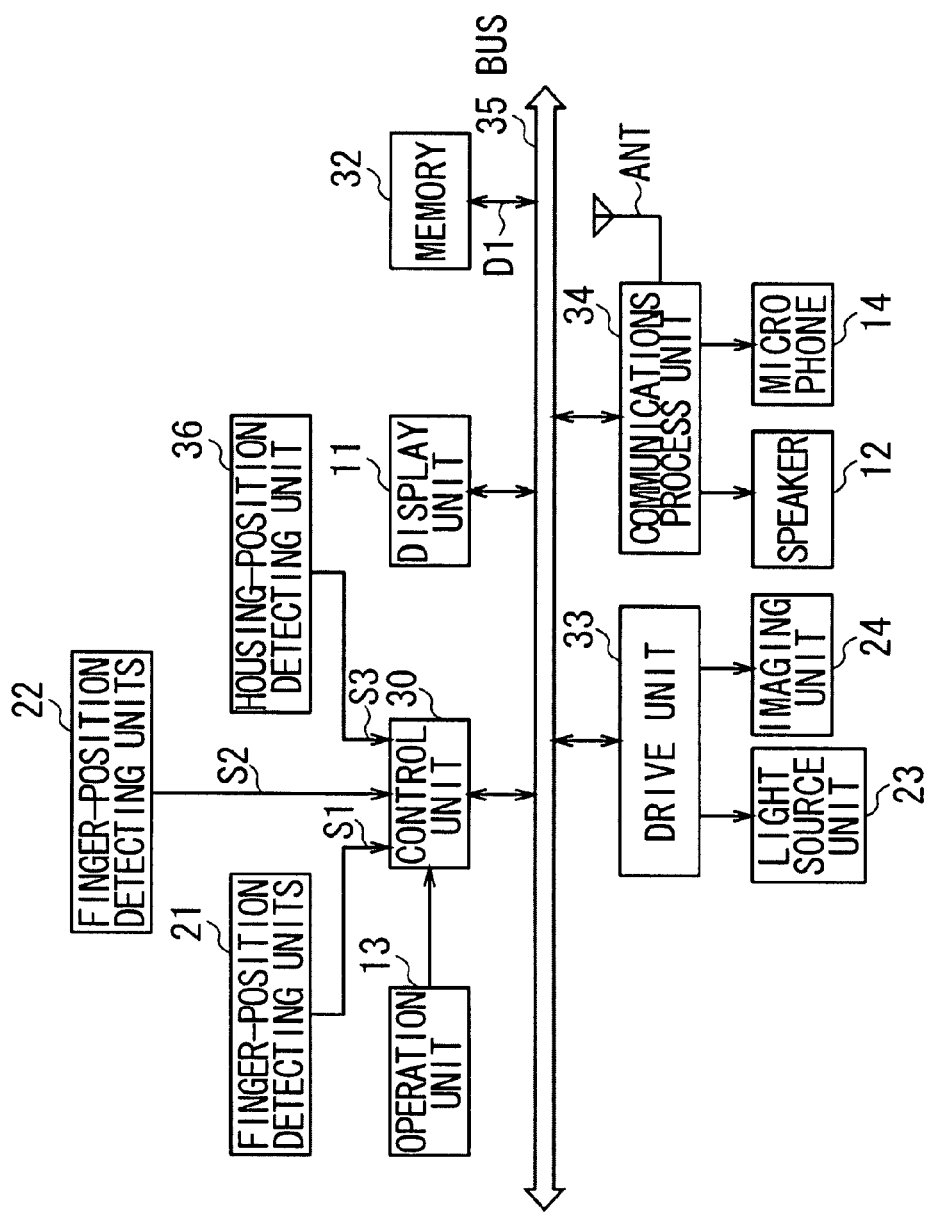
FIG. 4 is a block diagram showing the circuit configuration the cellular telephone.

The circuit configuration of the cellular telephone 1 will be described. As shown in FIG. 4, the cellular telephone 1 includes a control unit 30, a display unit 11, a memory 32, a drive unit 33, a communications process unit 34 and a bus 35. The bus 35 connects the display unit 11, memory 32, drive unit 33 and communications process unit 34 to the control unit 30.

The control unit 30 is a microcomputer that includes a Central Processing Unit (CPU), a Read Only Memory (ROM), and a Random Access Memory (RAM). The CPU controls the entire cellular telephone 1. The ROM stores various programs and various preset information items. The RAM is used as work memory of the CPU.

The control unit 30 receives various instructions the operation unit 13 generates when operated by the user (hereinafter called registrant) who should be registered. Among the instructions are an instruction for setting the telephone 1 to the blood-vessel registering mode, an instruction for setting the telephone 1 to the authentication mode, an instruction for setting the telephone 1 to the E-mail generating/transmitting mode, and an instruction for setting the telephone 1 to the call mode. In the blood-vessel registering mode, the blood-vessel pattern of the registrant is registered. In the authentication mode, the registrant is authenticated. In the E-mail generating/transmitting mode, an E-mail is prepared and transmitted.

Detection signals S1 and S2 indicating that the finger is laid on the surface P1 of the first housing 2 are input to the control unit 30 from the finger-position detecting units 21 and 22. Further, a detection signal S3 indicating that the first housing 2 inclines to the second housing 3 at the finger-imaging angle θ is input to the control unit 30 from a housing-position detecting unit 36 that is provided at a predetermined position on the cellular telephone 1.

The control unit 30 determines the mode to execute, from the instruction input to it. Using the program corresponding to the mode determined, the control unit 30 controls the display unit 11, memory 32, drive unit 33 and communications process unit 34 in accordance with the detection signals S1, S2 and S3, thereby to perform various processes.

The display unit 11 is configured to display on its screen the characters and figures represented by the display data supplied from the control unit 30.

The memory 32 is, for example, a flash memory. The memory 32 stores audio data, video data and E-mail data and registrant data. The registrant data (hereinafter referred to as registered data) has been generated in the blood-vessel registering mode.

The drive unit 33 drives the light source unit 23, which emits near-infrared light. The drive unit 33 adjusts the position of a lens included in the optical system of the imaging unit 24. It also adjusts the opening of the diaphragm and the shutter-moving speed (i.e., exposure time) on the basis of the Exposure Value (EV) set by the control unit 30, thereby to apply an appropriate amount of light to the imaging element. When the lens position, the diaphragm opening and the shutter-moving speed are thus adjusted, the imaging element generates imaging data. The imaging data is supplied to the control unit 30.

The communications process unit 34 receives various signals from the microphone 14 or the control unit 30, modulates the signals in a particular way, and amplifies the signals thus modulated. The signals modulated and amplified are transmitted from the antenna ANT of the cellular telephone 1 to a base station (not shown) as an up-link wave signal.

The communications process unit 34 receives a down-link wave signal transmitted from the base station (not shown) and caught by the antenna ANT. The communications process unit 34 amplifies and demodulates the down-link wave signal. The signal amplified and demodulated is supplied to the speaker 12 or the control unit 30.

(3) Processes Performed by the Control Unit

It will be explained how the control unit 30 operates while the cellular telephone 1 remains in the blood-vessel registering mode and how the control unit 30 operates when the cellular telephone 1 remains in the authentication mode.

(3-1) In Blood-vessel Registering Mode

If the control unit 30 determines that the blood-vessel registering mode should be executed, it changes the present operating mode of the cellular telephone 1 to the blood-vessel registering mode and starts the process (FIG. 5) of registering the blood-vessel pattern of the user.

In this case, the control unit 30 causes the display unit 11 to display a first message and a second message. The first message prompts the user to move the first housing 2 or the second housing 3 to tilt one housing to the other at the finger-imaging angle θ. The second message prompts the user to stretch his or her finger straight and to lay it on the finger-position detecting units 21 and 22 of the first housing 2. At the same time, the control unit 30 causes the speaker 12 to generate aural version of these messages.

Figure 5:
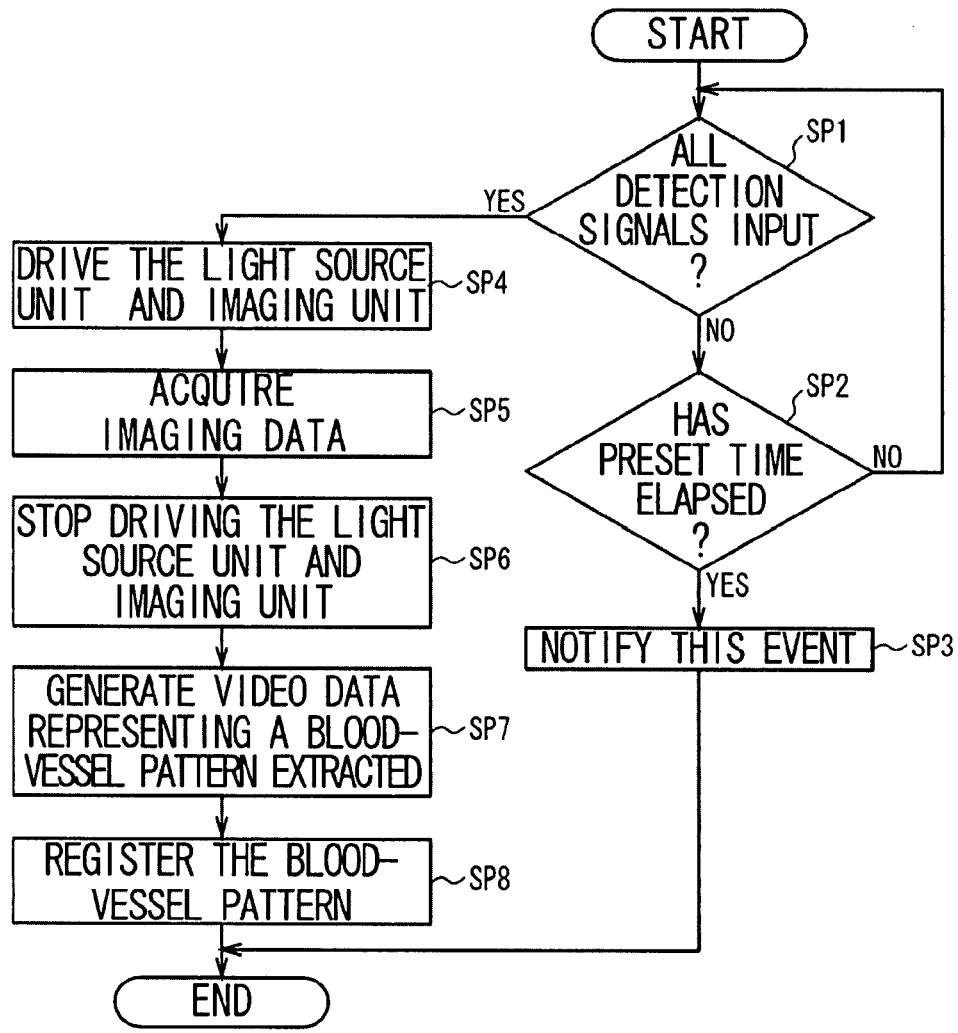
FIG. 5 is a flowchart explaining the sequence of registering a blood-vessel pattern.

Then, the control unit 30 waits for the detection signals S1 and S2 to come from the finger-position detecting units 21 and 22 and the detection signal S3 to come from the housing-position detecting unit 36 (loop of Steps SP1 and SP2, shown in FIG. 5).

The detection signals S1 and S2 may not input from the finger-position detecting units 21 and 22. This means that the user has not laid his or her finger at the designated position on the first housing 2.

Only one of the detection signals S1 and S2 may be input from the finger-position detecting unit 21 or the finger-position detecting unit 22. This means that the user's finger laid at the designated position does not extend at right angles to the optical axis of the imaging unit 24 (equivalent to the one-dot, dashed line extending between the imaging unit 24 and midpoint MP), or parallel to the line connecting the finger-position detecting units 21 and 22. Otherwise, this means that the finger tip reaches neither the finger-position detecting unit 21 nor the finger-position detecting unit 22.

The detection signal S3 may not be input from the housing-position detecting unit 36. This means that neither the surface P1 of the first housing 2 nor the surface P2 of the second housing 3 defines the finger-imaging angle θ (shown in FIG. 3). That is, the finger-position detecting units 21 and 22 and the imaging unit 24 do not have such a positional relation that the projected blood-vessel pattern undergoes but a minimum distortion.

Therefore, if the control unit 30 does not receive all detection signals S1, S2 and S3 from the finger-position detecting units 21 and 22 and the housing-position detecting unit 36 even after a preset time elapses from the change of the operating mode to the blood-vessel registering mode (if YES in Step SP2, FIG. 5), the control unit 30 causes the display unit 11 and the speaker 12 to inform the user that the preset time has elapsed (Step SP3, FIG. 5). Then, this registering process is terminated.

The control unit 30 may receive all detection signals S1, S2 and S3 from the finger-position detecting units 21 and 22 and the housing-position detecting unit 36 before the preset time elapses (if YES in Step SP1, FIG. 5). In this case, the control unit 30 drives the light source unit 23 and the imaging unit 24. Therefore, the imaging unit 24 starts imaging the blood vessels existing in the finger (Step SP4, FIG. 5).

The control unit 30 may not receive any one of the detection signals S1, S2 and S3 after it started driving the light source unit 23 and the imaging unit 24 and before imaging data is acquired. If this is the case, the control unit 30 stops driving the imaging unit 24 and causes the display unit 11 and the speaker 12 to give the first and second messages based on the detection signals S1, S2 and S3. Unless the detection signal not received is input again before a preset time elapses from the issuing of the first and second messages, the process of registering the blood-vessel pattern is terminated.

Then, the control unit 30 acquires imaging data from the imaging unit 24 that has been driven (Step SP5, FIG. 5). Next, the control unit 30 stops driving the light source unit 23 and the imaging unit 24 (Step SP6, FIG. 5). Further, the control unit 30 sequentially performs, for example, edge extraction, image extraction, edge smoothing, binary encoding and thinning on the imaging data, thereby extracting a blood-vessel pattern from the image represented by the imaging data (Step SP7, FIG. 5).

Thereafter, the control unit 30 stores or registers the blood-vessel pattern in the flash memory 13 as registered data (Step SP8, FIG. 5). The process of registering the blood-vessel pattern is then terminated.

The control unit 30 can thus execute the blood-vessel registering mode.

(3-2) Authentication Mode

If the control unit 30 determines that the authentication mode should be executed, it changes the operating mode of the cellular telephone 1 to the authentication mode. The authentication process (FIG. 6) is thereby started.

As in the blood-vessel registering mode, the control unit 30 gives the user the first and second messages, prompting the user to move the first housing 2 or the second housing 3 to incline one housing to the other housing at the finger-imaging angle θ (FIG. 3) and to stretch his or her finger straight and lay it on the finger-position detecting units 21 and 22 of the first housing 2.

The control unit 30 then waits for the detection signals S1 and S2 to come from the finger-position detecting units 21 and 22 and the detection signal S3 to come from the housing-position detecting unit 36 (loop of Steps SP11 and SP12, shown in FIG. 6), as in the blood-vessel registering mode. If the control unit 30 does not receive all detection signals S1, S2 and S3 even after a preset time elapses after the operating mode has changed to the authentication mode (if YES in Step SP12, FIG. 5), the control unit 30 causes the display unit 11 and the speaker 12 to inform the user that the preset time has elapsed (Step SP13, FIG. 6). The authentication process is then terminated.

Figure 6:
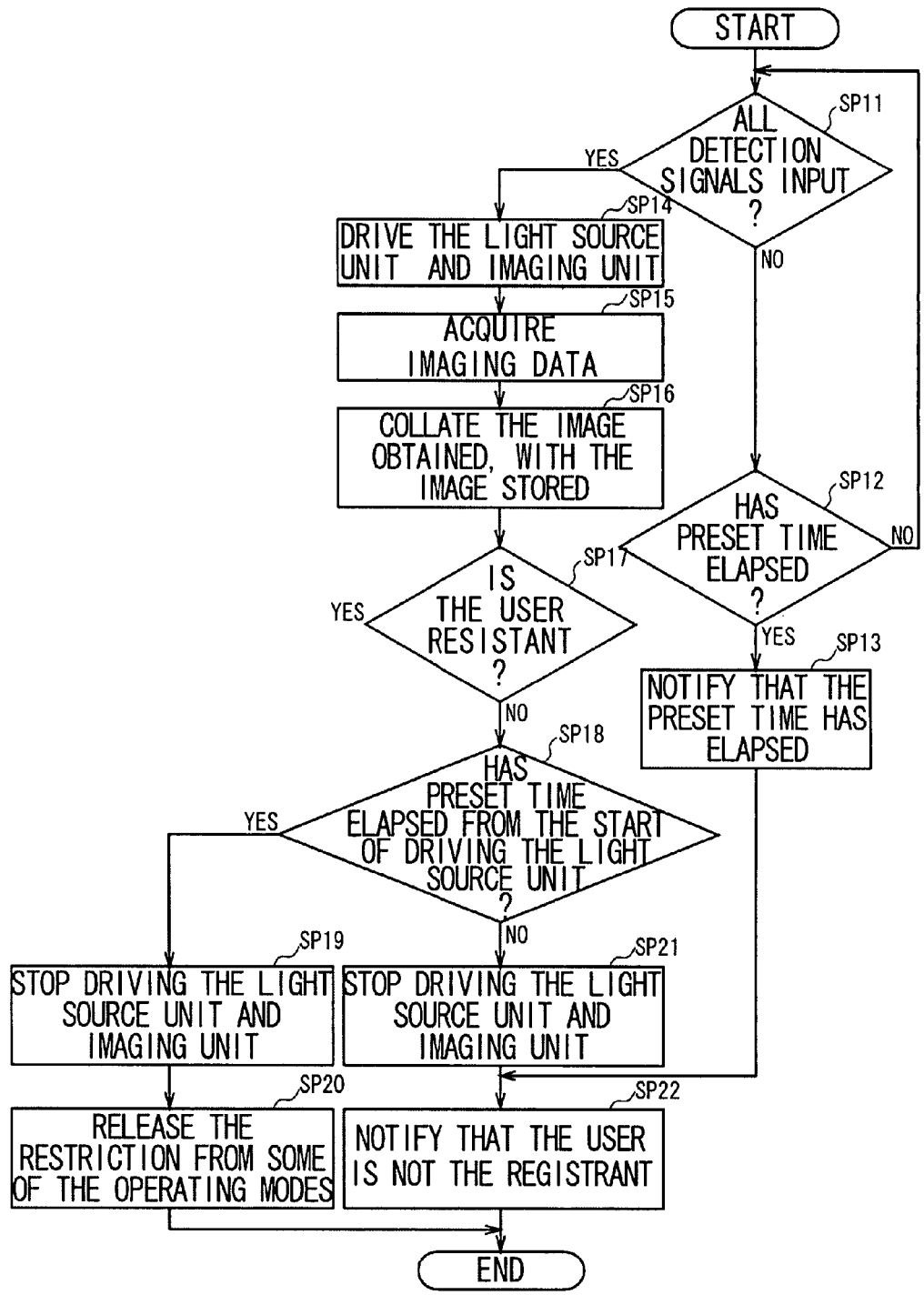
FIG. 6 is a flowchart explaining the sequence of authenticating the user.

The control unit 30 may receive all detection signals S1, S2 and S3 from the finger-position detecting units 21 and 22 and the housing-position detecting unit 36 before the preset time elapses (if YES in Step SP11, FIG. 6). In this case, the control unit 30 drives the light source unit 23 and the imaging unit 24. Therefore, the imaging unit 24 starts imaging the blood vessels existing in the finger (Step SP14, FIG. 6). The control unit 30 processes the photograph data supplied from the imaging unit 24 in the same way as in the blood-vessel registering mode (Step SP15, FIG. 6).

The control unit 30 collates the image obtained as a result of the image processing, with the image represented by the data stored in the flash memory 13 (Step SP16, FIG. 6). From the degree to which the image is similar to the image represented by the data stored in the flash memory 13, the control unit 30 determines whether the user is the registrant (i.e., authenticated user) (Step SP17, FIG. 6).

If the control unit 30 determines that the user is not the registrant (if NO in Step SP17, FIG. 6), it reacquires the imaging data the imaging unit 24 has supplied until a present time elapses from the time the light source unit 23 and the imaging unit 24 have started operating. Then, the control unit 30 collates again the image obtained as a result of the imaging data with the image represented by the data stored in the flash memory 13 (loop of Steps SP15 and SP18, shown in FIG. 6).

The control unit 30 may not receive any one of the detection signals S1, S2 and S3 after it started driving the light source unit 23 and the imaging unit 24 until the user is found to be the registrant as a result of the collation. If this is the case, the control unit 30 stops driving the imaging unit 24 and causes the display unit 11 and the speaker 12 to give the first and second messages based on the detection signals S1, S2 and S3. Unless the detection signal not received is input before a preset time elapses from the issuing of the first and second messages, the control unit 30 terminates the authentication process.

The control unit 30 may determine that the user is the registrant (YES in Step SP17, FIG. 6), it stops driving the driving the light source unit 23 and the imaging unit 24 (Step SP19, FIG. 6). Next, the control unit 30 releases the restriction imposed on, for example, some of the operating modes (Step SP20, FIG. 6). The control unit 30 then terminates the authentication process.

While the user remains not determined to be the registrant, the preset time may elapse after the control unit 30 started driving the light source unit 23 and the imaging unit 24 (YES in Step SP18, FIG. 6). In this case, the control unit stops driving the light source unit 23 and the imaging unit 24 (Step SP21, FIG. 6). The control unit 30 then causes the display unit 11 and the speaker 12 to inform, both visually and aurally, the user that he or she is not the registrant (Step SP22, FIG. 6). Then, the control unit 30 terminates the authentication process.

Thus, the control unit 30 is configured to execute the authentication mode.

(4) Operation and Advantages

The cellular telephone 1 configured as described above has the finger-position detecting units 21 and 22, which are arranged on the surface P1 of the first housing 2 and spaced apart by a prescribed distance to contact the user's finger stretched straight and laid on the surface P1.

In the cellular telephone 1, the control unit 30 drives the light source unit 23 and the imaging unit 24, upon receiving the detection signals S1 and S2 from the finger-position detecting units 21 and 22, respectively. The imaging unit 24 starts imaging the blood vessels existing in the finger placed on the finger-position detecting units 21 and 22.

In the cellular telephone 1, the finger-position detecting units 21 and 22 are used not only as triggers for the imaging of the blood vessels, but also as guide for guiding the user's finger to the finger-resting position.

Hence, the user can lay his or her finger, with no inclination (positional deviation) with respect to the imaging unit 24, though the cellular telephone 1 has no finger guides. The finger-position detecting units 21 and 22 are used as guide for guiding the user's finger to the finger-resting position. Therefore, the cellular telephone 1 is smaller than in the case where it has a physical finger guide.

In the cellular telephone 1 according to the present embodiment, the imaging light is applied to the imaging element through the imaging opening OP that extends perpendicular to the surface P1 of the first housing 2 when the control unit 30 receives the detection signal S3, in addition to the detection signals S1 and S2. Note that the detection signal S3 indicates that one of the housings 2 and 3 is inclined to the other housing at the angle selected as an angle at which to image the blood vessels in the finger (i.e., finger-imaging angle θ, shown in FIG. 3).

Therefore, the distortion of the projected blood-vessel pattern can be reduced in the cellular telephone 1.

The configuration described above can provide a cellular telephone 1 in which the finger-position detecting units 21 and 22 can function not only as triggers for the imaging of the blood vessels, but also as guide for guiding the user's finger to the finger-resting position. Positional deviation of the finger can therefore be prevented, though the telephone 1 has no finger guides.

(5) Other Embodiments

The embodiment described above is designed for use in imaging a biometric authentication target. Nonetheless, the present invention can be put to other various uses. For example, the invention can be applied to X-ray photography, in which the person who images first positions a part of the subject at a fixed imaging position and then images the part of the subject.

Hence, the imaging target is not limited to the finger. Rather, the wrist, palm, mouth, foot or chest may be imaged by the imaging apparatus according to the embodiment of the present invention. If the image imaged is used for biometric authentication, the pattern extracted from the image is not limited to a blood-vessel pattern as in the first embodiment. The pattern may be any other biometrical one, such as the fingerprint, the lip print, the nerve pattern, or the like.

In the embodiment described above, the sensors for detecting that the user has positioned his or her finger appropriately are pressure-detecting units. The present invention is not limited to this, nevertheless. Detecting units using radio waves may be employed instead.

Figure 7:
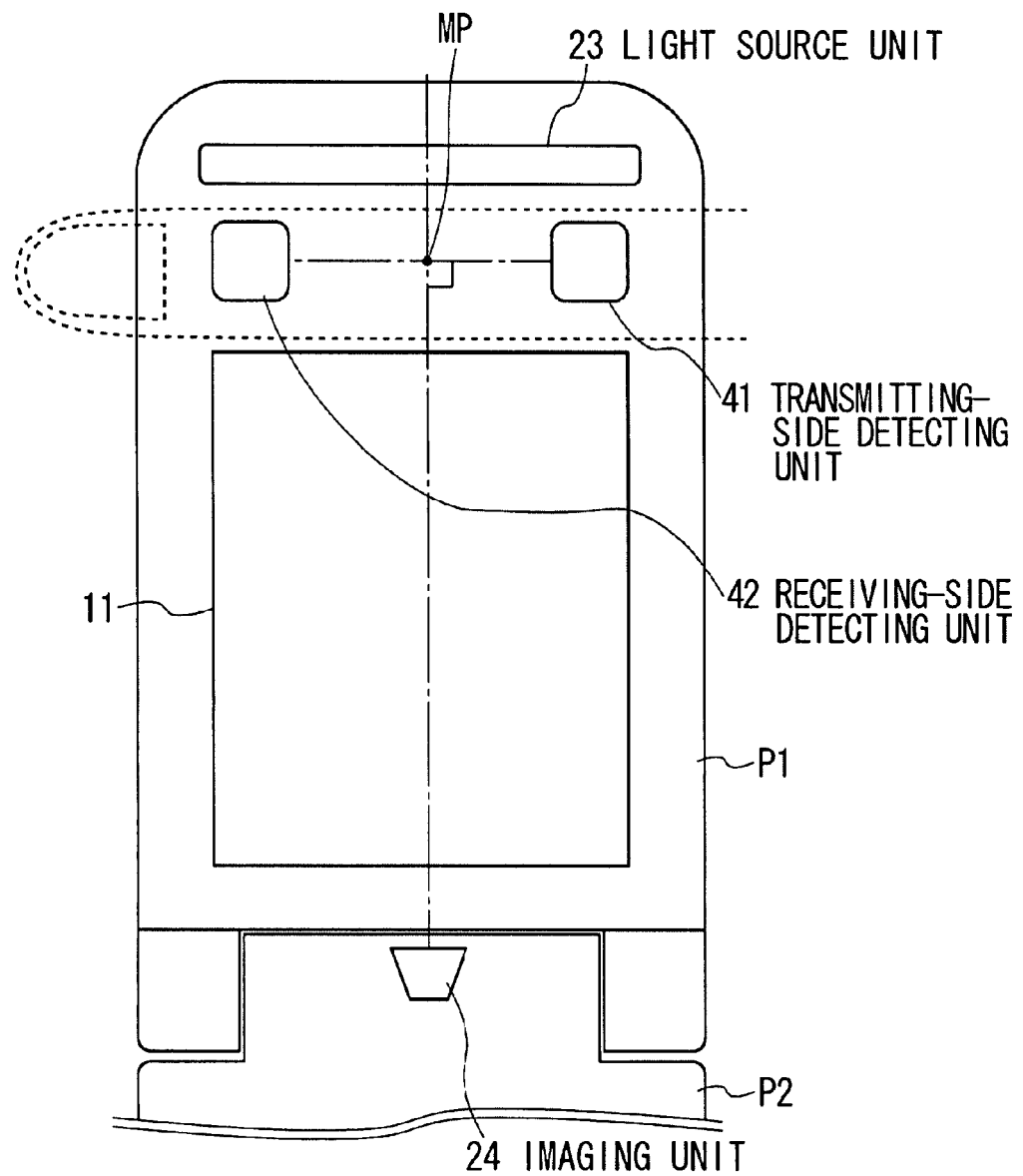
FIG. 7 is a diagram showing the configuration of the detecting units according to another embodiment of the present invention.

FIG. 7 shows detecting units using radio waves, which are applied to the embodiment described above. In FIG. 7, the components identical with those shown in FIG. 2 are designated by the same reference numbers. As shown in FIG. 7, a transmitting-side detecting unit 41 and a receiving-side detecting unit 42 are used, in place of the pressure-detecting units 21 and 22 (see FIG. 2).

Figure 8:
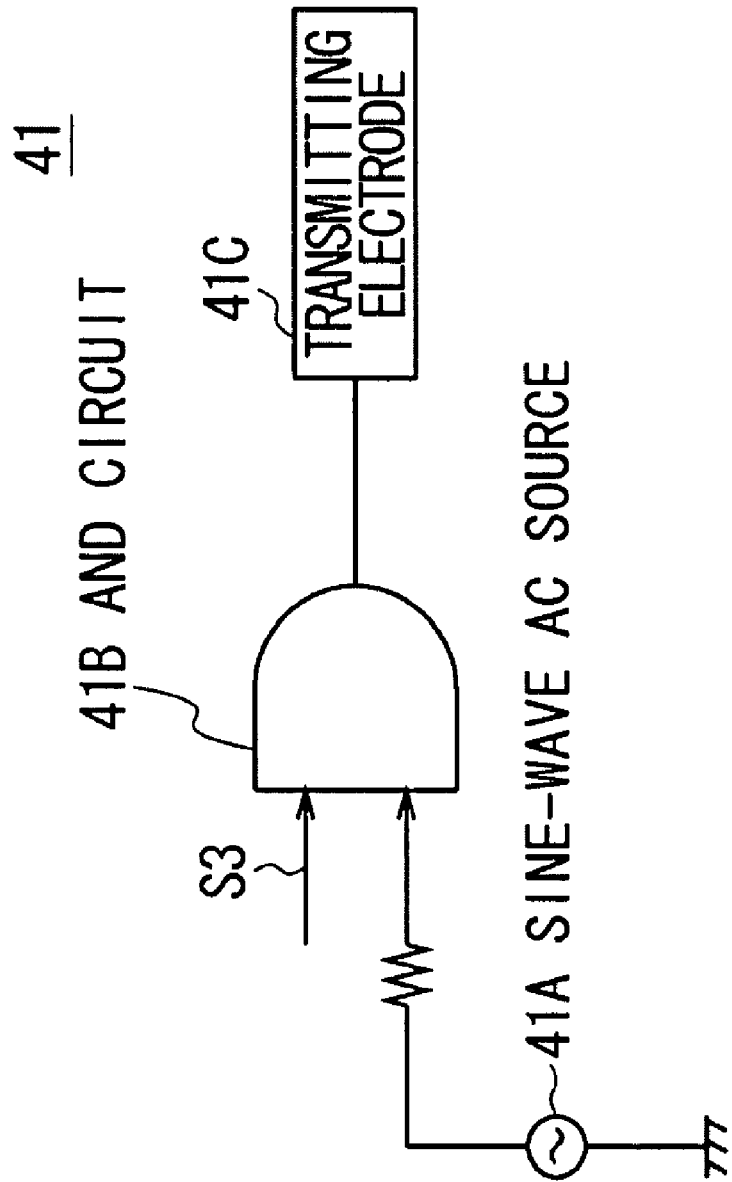
FIG. 8 is a diagram showing the configuration of the transmitting-side detecting unit.

As FIG. 8 shows, the transmitting-side detecting unit 41 includes a sine-wave AC source 41A, an AND circuit 41B, and a transmitting electrode 41C. To the AND circuit 41B, the sine-wave AC source 41A and a housing-position detecting unit 36 (of the same type as shown in FIG. 4) are connected. When the housing-position detecting unit 36 supplies the detection signal S3 through the AND circuit 41B, the transmitting electrode 41C transmits the signal output from the sine-wave AC source 41A.

Figure 9:
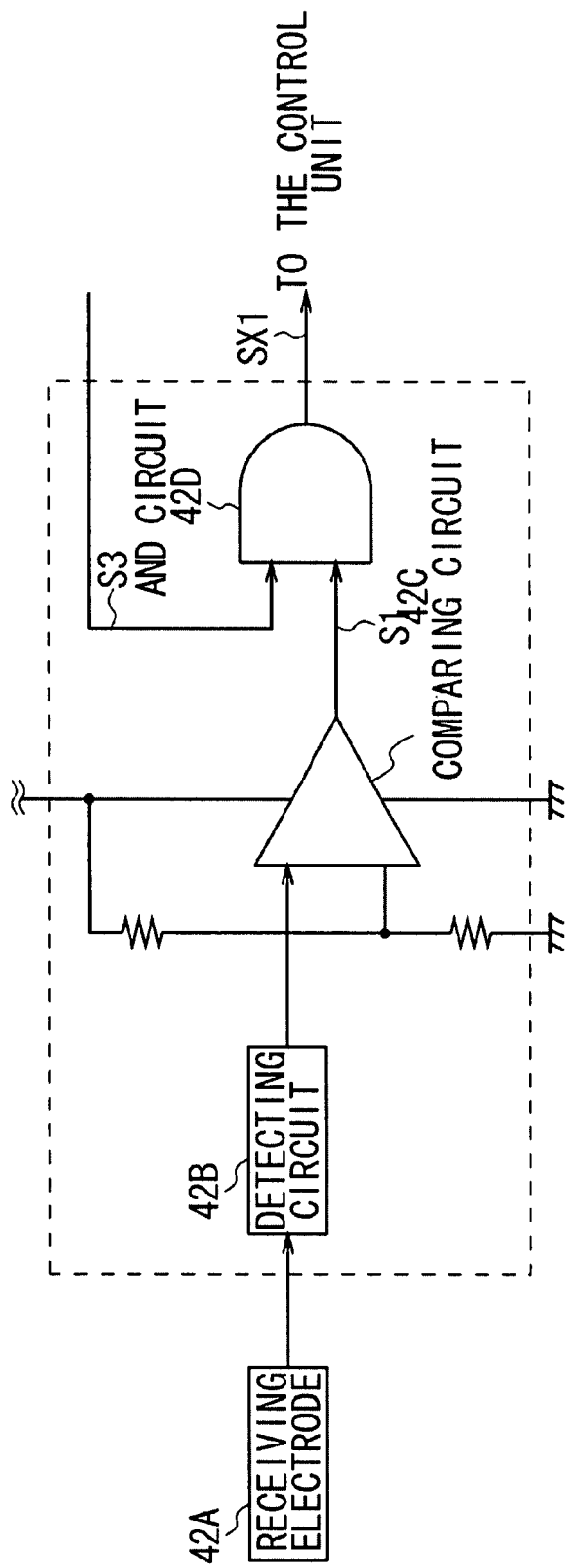
FIG. 9 is a diagram showing the configuration of the receiving-side detecting unit.

As FIG. 9 shows, in the receiving-side detecting unit 42, the receiving electrode 42A receives as input signal the signal transmitted from the transmitting electrode 41C of the transmitting-side detecting unit 41. The signal is input via the detecting circuit 42B to the comparing circuit 42C.

The comparing circuit 42C generates a detection signal S1 if the amplitude of the input signal is greater than the reference voltage defined by potential-dividing resistors R1 and R2. The detection signal S1 is output to the AND circuit 42D.

The AND circuit 42D generates a detection signal SX1 when the detection signals S1 and S3 are input to it from the comparing circuit 42C and the housing-position detecting unit 36 (FIG. 4), respectively. The detection signal SX1 is supplied to the control unit 30. On receiving the detection signal SX1, the control unit 30 makes the drive unit 33 drive the imaging unit 24, which starts imaging the blood vessels.

If the use's finger is laid on neither the transmitting-side detecting unit 41 nor the receiving-side detecting unit 42, or on only one of the detecting units 41 and 42, the transmitting-side detecting unit 41 and the receiving-side detecting unit 42 are not electrically connected to each other. In this case, the amplitude of the signal input to the comparing circuit 42C is not greater than the reference voltage. Therefore, the comparing circuit 42C does not supply the detection signal SX1 to the control unit 30.

If the user's finger is laid on both the transmitting-side detecting unit 41 and the receiving-side detecting unit 42, the transmitting-side detecting unit 41 and the receiving-side detecting unit 42 are electrically connected to each other. In this case, the amplitude of the signal input to the comparing circuit 42C exceeds the reference voltage. The comparing circuit 42C therefore supplies the detection signal SX1 to the control unit 30. As a result, the imaging unit 24 starts imaging the blood vessels.

Figure 10:
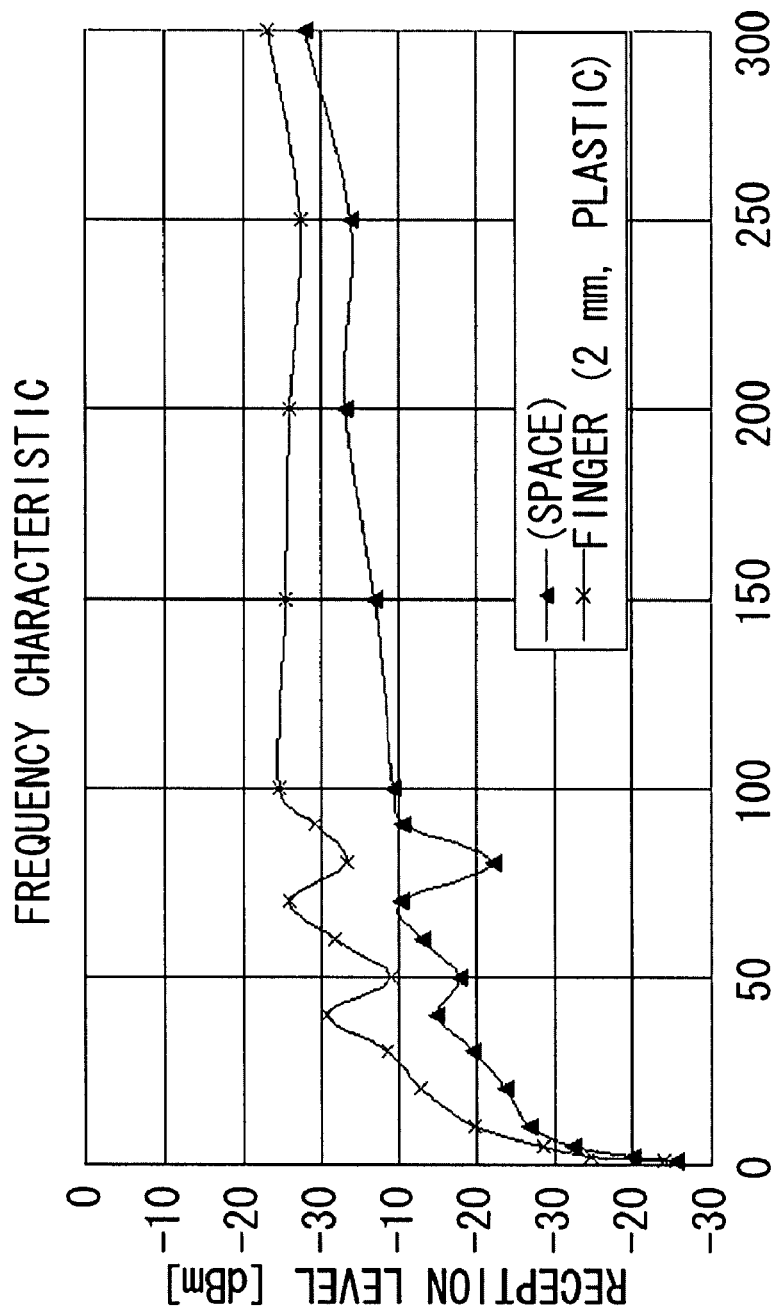
FIG. 10 is a graph representing the relation the transmission frequency and the reception sensitivity have when the user's finger is laid at a prescribed position and the relation they have when the user's finger is not laid at the prescribed position.

FIG. 10 represents the relation the frequency of the transmitted signal and the reception sensitivity have when the user's finger is laid at a prescribed position and the relation they have when user's finger is not laid at a prescribed position. As seen from FIG. 10, the difference in reception sensitivity between the two cases is prominent for the frequency of the transmitted signal ranging from about 80 MHz to about 150 MHz. Hence, whether the finger is laid at the prescribed position can be determined if the transmitted signal has a frequency falling in that range.

Thus, the transmitting-side detecting unit 41 and the receiving-side detecting unit 42 are arranged in conformity with the shape of the fingers. Further, the receiving-side detecting unit 42 detects the change in the level of the signal transmitted from the transmitting-side detecting unit 41. Hence, the finger can be detected to be stretched and set at the prescribed position, without contacting the surface P1 of the first housing 2 of the cellular telephone 1. The use of the detecting units using radio waves can render the cellular telephone 1 more user-friendly.

The sensors for detecting that the user has laid his or her finger at the prescribed position are not limited to the detecting units 41 and 42 using radio waves or the detecting units 21 and 22 of pressure type. The detecting units 41 and 42 or 21 and 22 may be replaced by sensors of any other type, such as humidity sensors, optical sensors (e.g., cameras) or the like.

Figure 11:
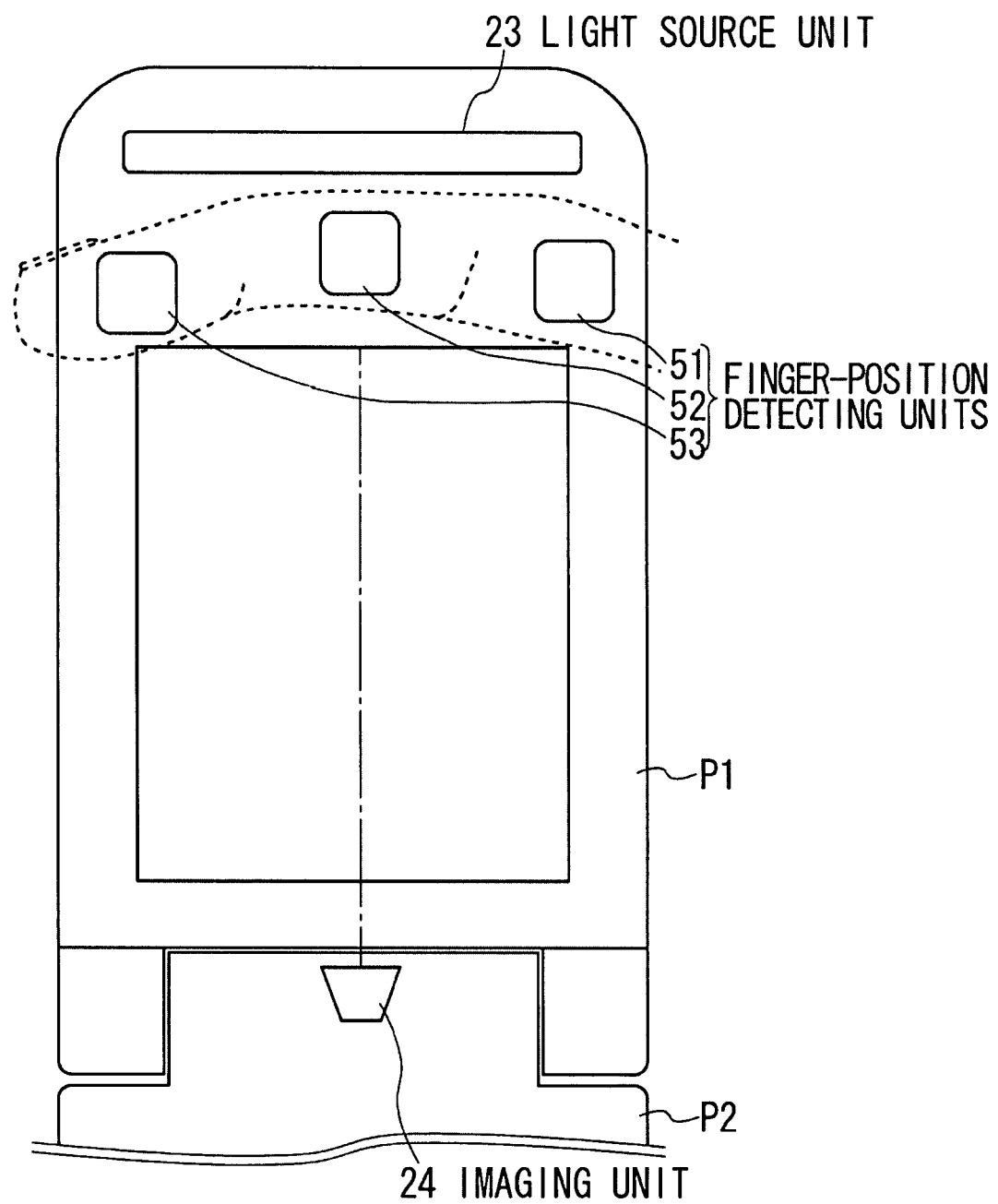
FIG. 11 is a diagram showing the finger-detecting units according to another embodiment of the present invention.

In the embodiment described above, the two finger-position detecting units 21 and 22 are arranged, spaced apart by a predetermined distance, in conformity with the cushion of the finger stretched straight. Nonetheless, the present invention is not limited to this. For example, as shown in FIG. 11 which illustrates another embodiment of the invention and in which the components identical to those shown in FIG. 2 are designated by the same reference numbers, three finger-position detecting units 51, 52 and 53 may be arranged at such intervals that the finger slightly bent may touch them, respectively at the part extending between the tip and the first joint, the part extending between the first and second joints, and the part extending between the second joint and the root.

Moreover, the wrist, palm, mouth or foot may be imaged. In this case, a plurality of detecting units may be arranged in accordance with the shape of such a part of the user. If an imaging target having an uneven surface, such as the face of human being, is imaged, a plurality of detecting units may be arranged in accordance with the directions in which the projecting parts extend. This means that the detecting units are arranged, not in a single plane only as in the embodiment described above.

In short, the same advantages can be achieved as in the embodiment described above, if two or more detecting units are arranged in conformity of the shape in which a part of a living body is laid.

In the embodiment described above, a message is given, prompting the user to lay a part (i.e., finger) of a living body on the detecting units. The present invention is not limited to this. The content of the message may be changed, in accordance with the number of detecting units that have detected a part of the living body.

In the embodiment described above, a messages is given, prompting the user to lay his or her finger if the control unit 30 does not receive the detection signals S1 and S2 from the finger-position detecting units 21 and 22, respectively, and a message is given, prompting the user to stretch and lay his or her finger perpendicular to the imaging unit 24 if the control unit 30 receives one of the detection signals S1 and S2 from the finger-position detecting unit 21 or 22.

In the configuration of FIG. 11, in which the finger-position detecting units 51 to 53, are arranged in a specific manner, a message is given, prompting the user to lay his or her finger on the finger-position detecting units 51 to 53 if the control unit 30 receives no detection signals from the finger-position detecting units 51 to 53 or receives a detection signal from only one of the finger-position detecting units 51 to 53.

If the control unit 30 receives two signals from the finger-position detecting units 51 and 52, respectively, a message is given, prompting the user to move his or her finger to the left if the finger is on the right hand, or to move the root of the finger downward if the finger is on the left hand. If the control unit 30 receives two signals from the finger-position detecting units 52 and 53, respectively, a message is given, prompting the user to move the root of his or her finger downward if the finger is on the right hand, or to move the finger to the right if the finger is on the left hand. If the control unit 30 receives two signals from the finger-position detecting units 51 and 53, respectively, a message is given, prompting the user to move the middle part of the finger upward.

In the configuration of FIG. 11, a message can be given both visually and aurally, informing the user of the direction in which to move a part of his or her body, on the basis of the positional relation between the part of his or her body and the detecting units detecting that part.

Thus, the user's finger can be guided not only by the detecting units arranged specifically, but also in accordance with the visual and aural message generated on the basis of what the detecting units have detected. This can more reliably prevent the positional deviation of the finger and can render the cellular telephone 1 more user-friendly.

In the embodiment described above, the imaging unit 24 is fixed in place. The present invention is not limited to this. The imaging unit 24 may be moved (or the imaging direction of the unit 24 may be changed) as the first and second housings 2 and 3 are rotated relative to each other, around the hinge unit 4. More precisely, the imaging unit 24 is positioned perpendicular to the surface P2 of the second housing 3 while the one of the housings 2 and 3 remains inclined to the other at an angle other than the finger-imaging angle θ (FIG. 3), and is positioned perpendicular to the surface P1 of the first housing 2 and 3 while the one of the housings 2 remains inclined to the finger-imaging angle θ (FIG. 3).

Therefore, ordinary imaging targets can be imaged while the one of the housings 2 and 3 remains inclined to the other at an angle other than the finger-imaging angle θ. This also renders the cellular telephone 1 user-friendly.

In the embodiment described above, the control unit 30 develops, on the RAM, the program stored in the ROM, and executes the blood-vessel registering mode or the authentication mode in accordance with the program thus developed. The present invention is not limited to this, nevertheless. The control unit 30 may execute the blood-vessel registering mode or the authentication mode in accordance with a program installed from a recording medium such as a Compact Disc (CD), a Digital Versatile Disc (DVD) or a semiconductor memory, or a program downloaded through the Internet.

In the embodiment described above, the control unit 30 performs various processes in accordance with software. This invention is not limited to this. Some of the processes, such as video-data processing, may be accomplished by using hardware.

The embodiment described above is a cellular telephone 1 that has a imaging function, a collating function and a registering function. The application of the present invention is not limited to cellular telephones. It can be applied to various types of apparatuses, each having, for example, one of the functions mentioned above.

The present invention can be used to image a part of a living body the user has laid at the fixed imaging position.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    a first housing;
    a second housing;
    at least two living-body detecting units that are provided on the first housing at a imaging position where a part of a living body is laid, in conformity with the shape of the part of the living body;
    an imaging unit provided on the second housing that images the part of the living body, which is laid at the imaging position;
    a drive unit that drives the imaging unit when all of the at least two living-body detecting units detect the part of the living body; and
    notification means configured to provide a first message indicating that either the first or second housing should be moved relative to the other housing and a second message indicating that the part of the living body should be laid on the at least two living-body detecting units;
    wherein the notification means is configured to change the content of the second message when one of the at least two living-body detecting units detects the part of the living body and another one of the at least two living-body detecting unit does not detect the part of the living body.

2. The imaging apparatus according to claim 1, wherein one of the at least two living-body detecting units transmits a signal having a predetermined frequency, and the remaining one or more living-body detecting units receive the signal and detect the part of the living body on the basis of a level change of the signal.

3. The imaging apparatus according to claim 1, wherein the part of the living body is laid, stretched straight or curved, at the imaging position, and the imaging unit is arranged on a perpendicular that passes midpoint on a line connecting the ends of the at least two living-body detecting units.

4. The imaging apparatus according to claim 1, wherein changing the content of the second message includes an indication to move the part of the living body in a certain direction.

5. The imaging apparatus according to claim 1, wherein the notification means gives the first message and the second message visually and aurally.

6. The imaging apparatus according to claim 1, wherein the at least two living-body detecting units includes three living-body detecting units.

7. The imaging apparatus according to claim 1, wherein, after a preset time elapses and the drive unit does not detect the living body from all of the at least two living-body detection units, the drive unit is configured to stop the imaging unit from imaging the part of the living body.

8. An imaging apparatus comprising:
    a first housing;
    a second housing;
    at least two living-body detecting units that are provided on the first housing at a imaging position where a part of a living body is laid, in conformity with the shape of the part of the living body;
    an imaging unit provided on the second housing and configured to image the part of the living body when laid at the imaging position;
    a drive unit configured to drive the imaging unit when all of the at least two living-body detecting units detect the living body; and
    notification means configured to provide a first message indicating that either the first or second housing should be moved relative to the other housing and a second message indicating that the part of the living body should be laid on the at least two living-body detecting units;
    wherein the notification means is configured to change the content of the second message when one of the at least two living-body detecting units detects the part of the living body and another one of the at least two living-body detecting unit does not detect the part of the living body; and
    when, after a preset time elapses and the drive unit does not detect the living body from all of the at least two living-body detection units, the drive unit is configured to stop the imaging unit from imaging the part of the living body.

9. The imaging apparatus according to claim 8, wherein changing the content of the second message includes an indication to move the part of the living body in a certain direction.

10. The imaging apparatus according to claim 8, wherein changing the content of the second message includes an indication that the preset time has elapsed.

11. The imaging apparatus according to claim 8, wherein the notification means gives the first message and the second message visually and aurally.

12. The imaging apparatus according to claim 8, wherein the at least two living-body detecting units includes three living-body detecting units.

* * * * *